(12) United States Patent
MacFarlane et al.

(10) Patent No.: US 8,322,991 B2
(45) Date of Patent: Dec. 4, 2012

(54) BALANCE WEIGHT

(75) Inventors: Russel MacFarlane, Jupiter, FL (US); Eric William Engebretsen, Avon, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 600 days.

(21) Appl. No.: 12/421,674

(22) Filed: Apr. 10, 2009

(65) Prior Publication Data

US 2010/0260605 A1 Oct. 14, 2010

(51) Int. Cl.
*B63H 7/00* (2006.01)
(52) U.S. Cl. .................................................... 416/144
(58) Field of Classification Search .............. 416/144, 416/145, 221, 245 R, 244 R, 245 A, 244 A; 16/400; 82/63
See application file for complete search history.

(56) References Cited

U.S. PATENT DOCUMENTS

| | | | |
|---|---|---|---|
| 1,730,742 A | 10/1929 | Nelson | |
| 1,773,319 A | 8/1930 | Rauen | |
| 2,297,226 A | 9/1942 | Muller-Keuth et al. | |
| 2,371,801 A | 3/1945 | Chester et al. | |
| 2,394,749 A | 2/1946 | Chester | |
| 2,401,247 A | 5/1946 | Hunter | |
| 3,799,693 A | 3/1974 | Hull | |
| 3,990,814 A | 11/1976 | Leone | |
| 4,393,650 A | 7/1983 | Pool | |
| 4,405,285 A | 9/1983 | Surdi | |
| 4,477,226 A | 10/1984 | Carreno | |
| 4,842,485 A | 6/1989 | Barber | |
| 5,149,251 A | 9/1992 | Scanlon et al. | |
| 5,545,010 A * | 8/1996 | Cederwall et al. | 416/145 |
| 5,573,378 A | 11/1996 | Barcza | |
| 6,082,186 A | 7/2000 | Detwiler | |
| 6,279,420 B1 * | 8/2001 | Knorowski et al. | 464/180 |
| 6,447,255 B1 | 9/2002 | Bagnall et al. | |
| 6,447,916 B1 | 9/2002 | Van Gool | |
| 6,561,763 B2 | 5/2003 | Breakwell | |
| 6,942,462 B2 | 9/2005 | Breakwell et al. | |
| 7,097,427 B2 | 8/2006 | Kuhns et al. | |
| 7,296,976 B2 | 11/2007 | Roever et al. | |
| 7,306,432 B2 | 12/2007 | Rockarts et al. | |
| 7,371,042 B2 | 5/2008 | Lee | |
| 7,377,749 B2 | 5/2008 | Charrier et al. | |
| 2004/0222329 A1 * | 11/2004 | Kuhns et al. | 244/6 |
| 2006/0013693 A1 * | 1/2006 | Meacham et al. | 416/244 R |
| 2008/0095613 A1 * | 4/2008 | Blanchard et al. | 415/140 |

FOREIGN PATENT DOCUMENTS

| | | |
|---|---|---|
| EP | 0294654 A2 | 12/1988 |
| EP | 0850831 A2 | 7/1998 |
| GB | 451553 | 8/1936 |
| GB | 2363170 A | 12/2001 |
| GB | 2364748 A | 2/2002 |
| JP | 2001065366 | 3/2001 |

* cited by examiner

*Primary Examiner* — A. Sefer
*Assistant Examiner* — Nikolay Yushin
(74) *Attorney, Agent, or Firm* — Krieg DeVault LLP

(57) ABSTRACT

A balance weight adapted to be assembled to a nose cone assembly of a turbine engine for improving a balance of the nose cone assembly is disclosed herein. The balance weight is one-piece and formed from a plurality of different materials including at least first and second materials. The first and second materials are arranged substantially heterogeneously relative to one another such that said first and second materials are separate from one another and fixed together.

25 Claims, 4 Drawing Sheets

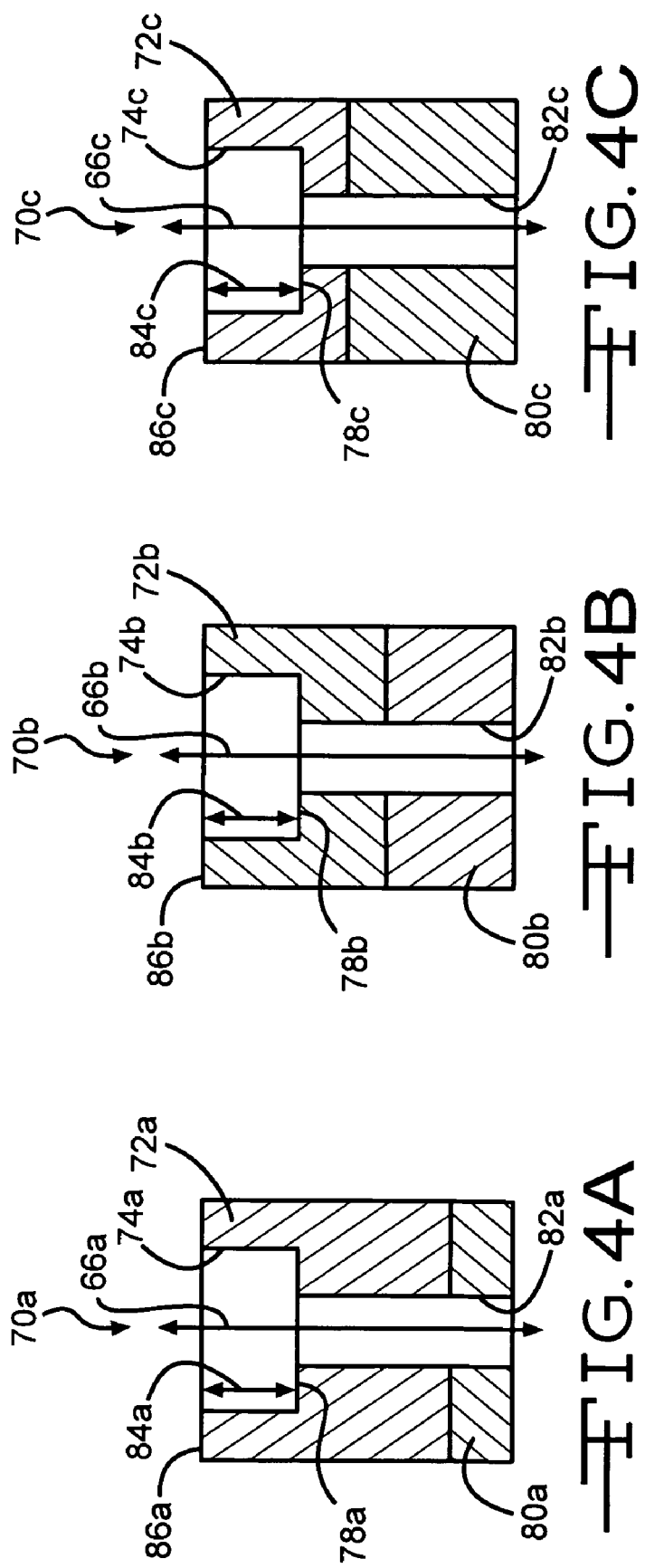

BALANCE WEIGHT

BACKGROUND OF THE INVENTION

1. Field of the Invention

The invention relates to a weight for balancing a structure such as a nose cone.

2. Description of Related Prior Art

Structures that rotate should be balanced to minimize vibration. This can be especially true for structures rotating at relatively high speeds, such as over 10,000 revolutions per minute. Balancing such structures can be achieved by either adding or removing material in selected regions of the structure. U.S. Pat. No. 4,477,226, at column 4, lines 58-63, discloses that a combination of individual balance weights can be used together and that the different balance weights can be made from different materials.

SUMMARY OF THE INVENTION

In summary, the invention is a balance weight adapted to be assembled to a nose cone assembly of a turbine engine for improving a balance of the nose cone assembly. The balance weight is one-piece and formed from a plurality of different materials including at least first and second materials. The first and second materials are arranged substantially heterogeneously relative to one another such that said first and second materials are separate from one another and fixed together.

BRIEF DESCRIPTION OF THE DRAWINGS

Advantages of the present invention will be readily appreciated as the same becomes better understood by reference to the following detailed description when considered in connection with the accompanying drawings wherein:

FIGS. 4A-4C show an exemplary combination of balance weights that could be included with other balance weights for a kit.

DETAILED DESCRIPTION OF THE EXEMPLARY EMBODIMENT

Figure 1:
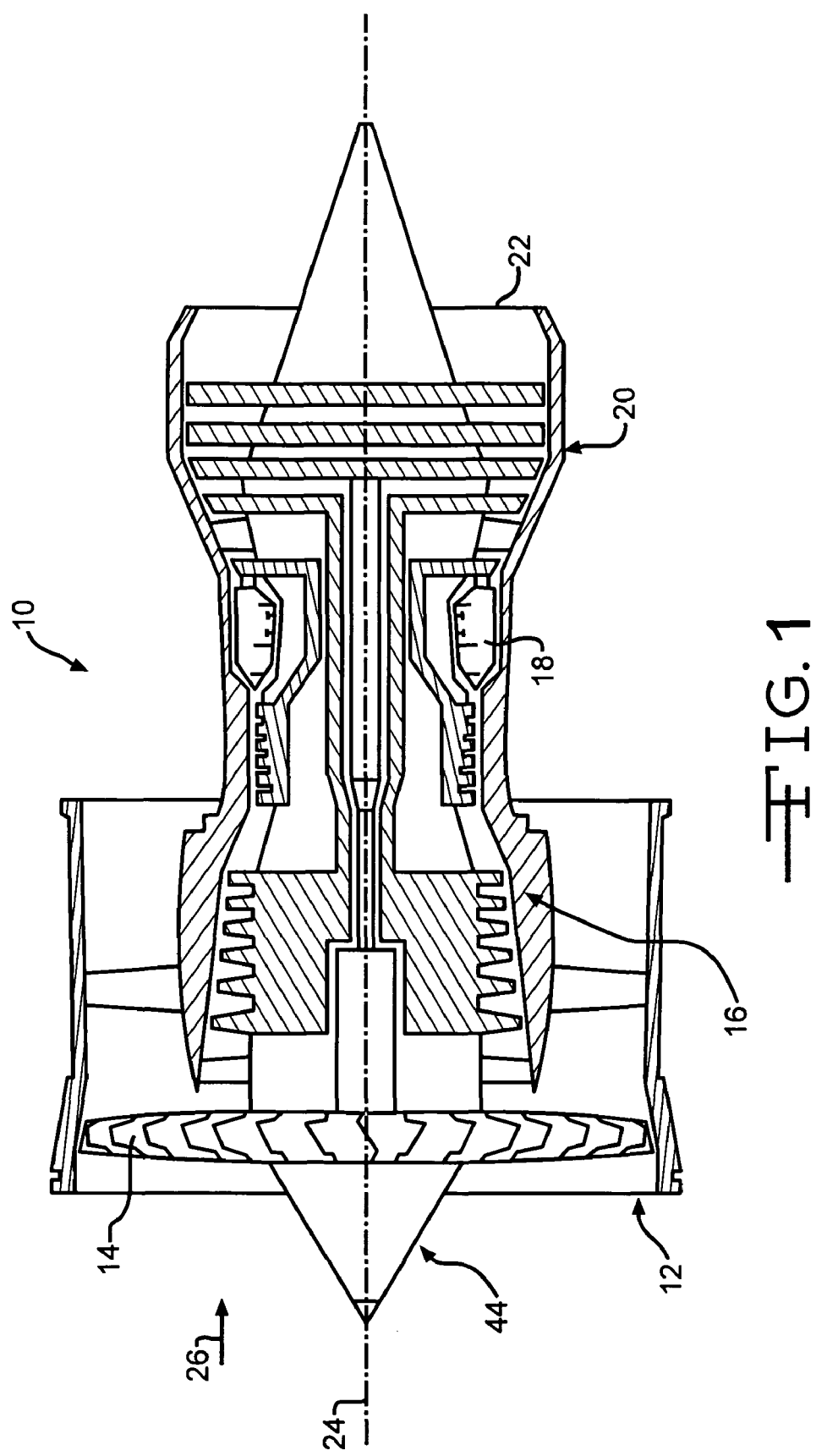
FIG. 1 is a cross-section of a turbine engine according to an embodiment of the invention.

A plurality of different embodiments of the invention is shown in the Figures of the application. Similar features are shown in the various embodiments of the invention. Similar features have been numbered with a common reference numeral and have been differentiated by an alphabetic suffix. Also, to enhance consistency, the structures in any particular drawing share the same alphabetic suffix even if a particular feature is shown in less than all embodiments. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

The invention, as exemplified in the embodiment described below, can be applied to balance a nose cone assembly of a turbine engine. Alternative embodiments can be practiced in different operating environments. The exemplary embodiment of the balance weight can practiced in a kit of balance weights, each having the same size but two or more having a different mass. Common size and different masses can be provided by forming the balance weight as one-piece with at least two body portions formed from different materials. The relative percentage of the different materials can be varied to produce balance weights of common size and different masses.

Referring to FIG. 1, a turbine engine 10 can include an inlet 12 and a fan 14. The exemplary fan 14 can be an assembly of, by way of example and not limitation, a disk, a plurality of blades received in slots in the disk, and a retainer. In alternative embodiments, the fan can be a "blisk" wherein the blades and the disk are integral. The turbine engine can also include a compressor section 16, a combustor section 18, and a turbine section 20. The turbine engine 10 can also include an exhaust section 22. The fan 14, compressor section 16, and turbine section 20 are all arranged to rotate about a centerline axis 24. A working fluid such as air can be drawn into the turbine engine 10 as indicated by the arrow referenced at 26. The fan 14 directs fluid to the compressor section 16 where it is compressed. The compressed fluid is mixed with fuel and ignited in the combustor section 18. Combustion gases exit the combustor section 18 and flow through the turbine section 20. Energy is extracted from the combustion gases in the turbine section 20.

Figure 2:
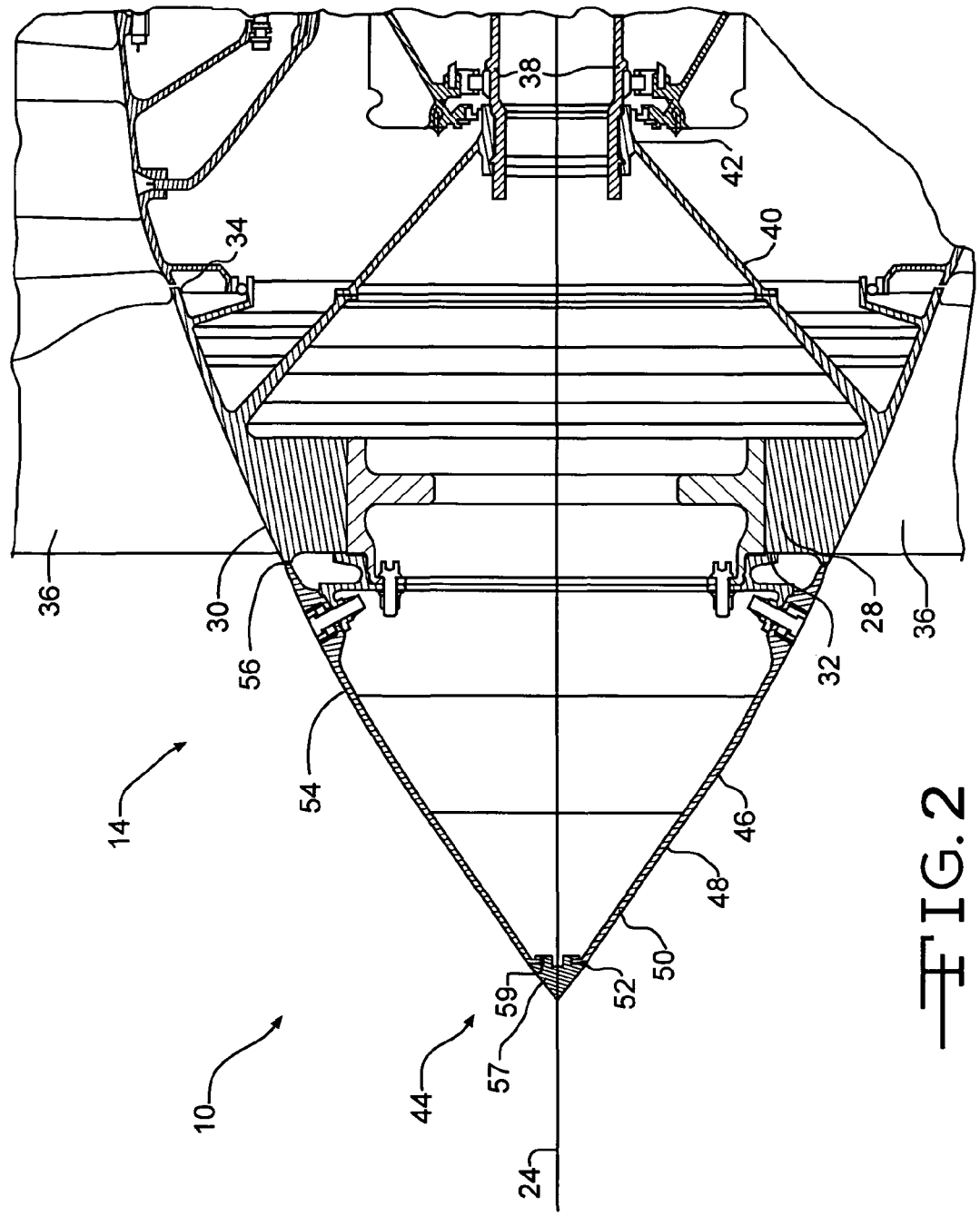
FIG. 2 is a magnified portion of FIG. 1 focusing on the nose cone assembly.

Referring now to FIG. 2, the fan 14 can include a hub 28 having an outer surface 30 and a plurality of blades 36 received in slots in the hub 28. The hub 28 can extend between a forward end 32 and an aft end 34. The terms forward or upstream and downstream or aft are used with respect to the general direction of the working fluid flow through the turbine engine 10. The blades 36 can be held in place with a retainer 37, which can also be viewed as part of the fan 14.

The fan 14 can be attached to a shaft 38 of the turbine engine 10. The shaft 38 can be the low pressure shaft and can drive the fan 14 in rotation to provide a flow of air through the inlet 12 (shown in FIG. 1). In the exemplary embodiment of the invention, the fan 14 can be connected to the shaft 38 through a cone drive 40, which is engaged to the shaft 38 through splines 42. Other structures can be applied to connect the hub 28 and the shaft 38 in alternative embodiments of the invention.

A nose cone assembly 44 can be attached to the retainer 37. The nose cone assembly 44 includes a spinner body 46 having an outer surface 48. The outer surface 48 defines at least part of a radially inner boundary of a fluid flow path into the fan 14. The spinner body 46 can extend along the axis 24 between an upstream portion 50 generally tapering to a truncated first end 52 and a base portion 54 at a second end 56.

A spinner tip 57 can be removably received in an aperture 59. The spinner tip 57 can be a unitary structure, integrally formed. The spinner tip 57 can be formed from elastomeric material. The spinner tip 57 can be engaged with the aperture 59 through a "snap-fit" connection whereby the spinner tip 57 is partially deformed during assembly and fully or partially returns to its original shape after insertion in the aperture 59.

The base portion 54 can be generally cylindrical. The term "generally cylindrical" is relative and can refer to a true cylindrical profile or a profile that tapers more gradually than the tapering at the upstream portion 50. The spinner body 46 can have a generally conical/ogive shape centered on the axis 24. The spinner body 46 can be formed from any material or combination of materials appropriate in view of the operating environment of the turbine engine 10.

Figure 3:
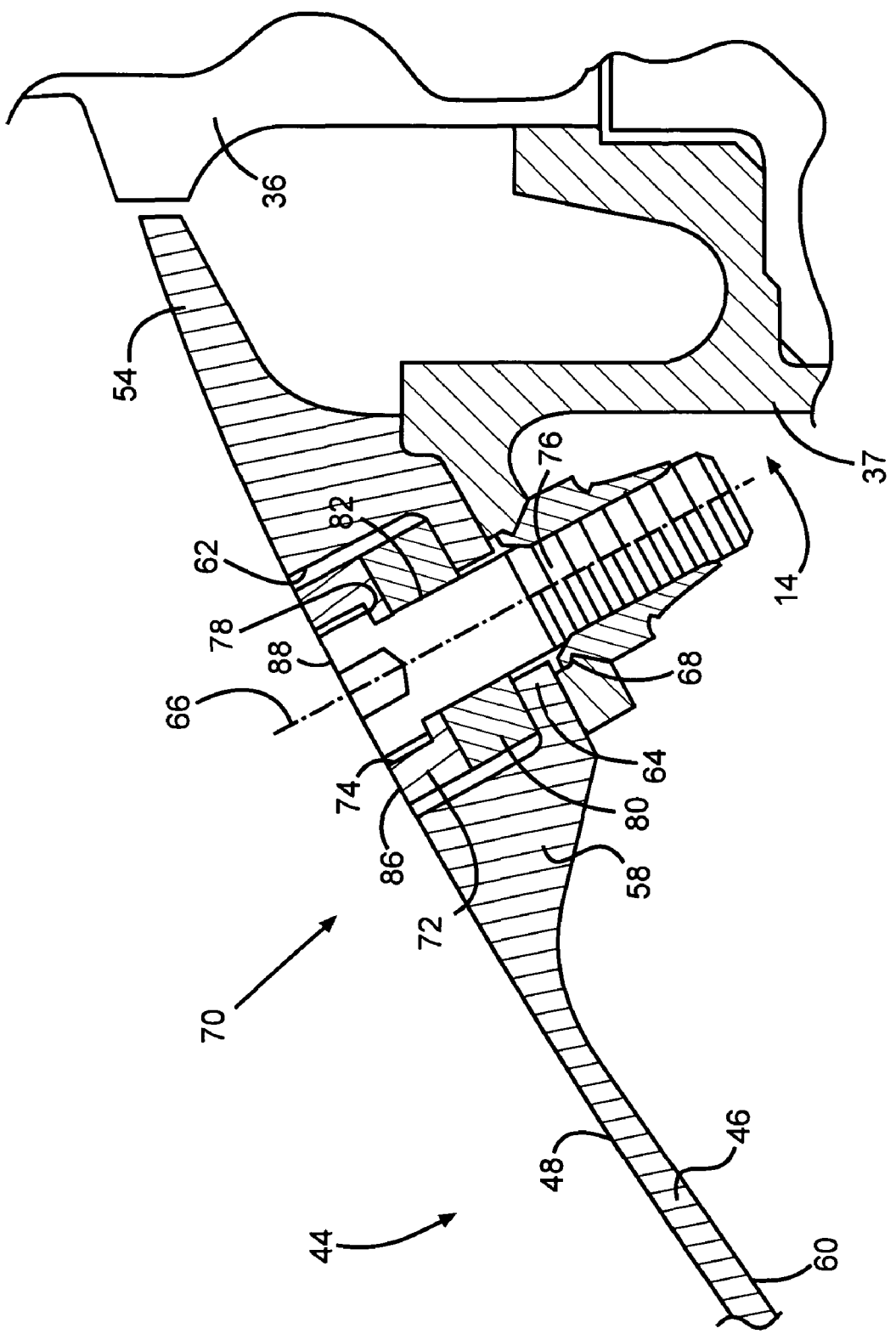
FIG. 3 is a magnified portion of FIG. 2 focusing on the connecting structure.

Referring now to FIG. 3, the nose cone assembly 44 can also include a plurality of protuberances 58 extending radially inward from an inner surface 60 of the spinner body 46. The protuberances 58 can be adjacent to the base portion 54. An aperture 62 can be defined in each of the protuberance 58 and include a counter-sunk portion defining a shoulder 64. In alternative embodiments of the invention, the spinner body 46 can include a thickened ring portion adjacent to the base portion 54 instead of a plurality of protuberances 58 and the apertures 62 can be defined in spaced locations along the thickened ring portion.

The aperture 62 can extend normal to the outer surface 48 along an axis 66. The retainer 37 can define an aperture 68 extending along the axis 66 when the spinner body 46 is coupled to the fan 14. The apertures 62 and 68 can thus be aligned when the spinner body 46 is coupled to the fan 14.

A balance weight 70 is adapted to be assembled to the nose cone assembly 44 for improving a balance of the nose cone assembly 44 and minimize vibration. The balance weight 70 is one-piece and formed from a plurality of different materials including at least first and second materials. The first and second materials are arranged substantially heterogeneously relative to one another in embodiments of the invention and not mixed together, such as in an alloy or composition. The first and second materials are separate from one another and fixed together. The exemplary first and second materials are fully heterogenous from one another and define different portions of the balance weight 70.

The exemplary balance weight 70 includes a first body portion 72 formed from the first material. The exemplary first body portion 72 can be cylindrical or any other shape and define an aperture 74 for receiving a fastener 76. The aperture 74 can include a counter-sunk portion defining a shoulder 78. The aperture 74 can extend along the axis 66 when the spinner body 46 is coupled to the fan 14. The apertures 62, 68, and 74 can thus be aligned when the spinner body 46 is coupled to the fan 14.

The exemplary balance weight 70 also includes a second body portion 80 formed from the second material. The exemplary second body portion 80 can be cylindrical or any other shape and define an aperture 82 for receiving the fastener 76. The aperture 82 can extend along the axis 66 when the spinner body 46 is coupled to the fan 14. The apertures 62, 68, 74, and 82 can thus be aligned when the spinner body 46 is coupled to the fan 14. The first and second body portions 72, 80 can be joined to one another with adhesive or other joining method, such as welding or brazing.

FIG. 3 is a magnified view of the connecting structure in "final" assembly, wherein the balance weight 70 is assembled with the nose cone assembly 44 and the retainer 37. However, prior to final assembly, a balancing operation can be carried out to correct any imbalance in the nose cone assembly 44. In carrying out a balancing operation, the nose cone assembly 44 and fan 14 can be assembled together such that the apertures 62 and 68 around the entire periphery of the base portion 54 are aligned. A blank or spacer having a similar shape to the balance weight 70 can be used in place of the exemplary balance weight 70 at all of the connecting apertures 62, 68 adjacent to the base portion 54. The blanks can be formed from a single material, such as aluminum or another material having relatively low density.

The assembled structure can then be rotated to identify any imbalance. If, when the turbine engine 10 (reference in FIG. 1) is rotated, the engine vibrations are over predetermined limits, a technician can use a combination of engine vibration readings from accelerometers mounted on the engine and a once-per-revolution sensor to identify where the addition of weight would reduce vibration. A laser sight might also be used in place of a once-per-rev sensor. When an imbalance is identified, a balance weight such as the exemplary balance weight 70 can replace one of the blanks. More than one of the blanks can be replaced with a balance weight 70 to correct the imbalance. The balance weight 70 will generally weigh more (have greater mass) than the blank that it replaces. The balance weight 70 could also weigh less (have less mass) than the blank that it replaces.

It can be desirable to complete a balancing operation with a kit having a plurality of balance weights of different mass. For example, correcting an imbalance may require positioning a balance weight of a first mass at a first mounting location between the nose cone assembly 44 and the retainer 37 and also require a balance weight of a second mass different from the first mass at a second mounting location. The balance weight 70 can be part of a kit of generally similar balance weights, each adapted to be assembled to the nose cone assembly 44. All of the balance weights 70 can be the same shape and size, but have a different mass/weight.

The relative percentage of the different materials can be varied to produce balance weights 70 of common size and different masses. A "material" for forming a discrete portion of the balance weight 70 can be defined by an element, such as aluminum, or can be defined by a combination of elements. The first and second materials can be chosen based on their respective densities. The ratio of the respective densities between the first and second materials can be maximized. For example, the density of the first material can be at least twice a density of the second material in an embodiment of the invention. The density ratio may be lower than 2:1 if desired or, alternatively, the ratio of the respective densities can be higher. In the exemplary embodiment of the invention, the first material can be aluminum and the second material can be tungsten. Thus, density ratio of the exemplary balance weight 70 can be approximately 7.5:1.

FIGS. 4A-4C show an exemplary combination of balance weights 70a-70c that could be included with other balance weights 70 for a kit. The blanks, as described above, can also be included in a kit with the balance weights 70a-70c and other balance weights 70. The balance weights 70a-70c are shown in cross-section. In FIG. 4A, a first balance weight 70a can include a first body portion 72a of a first material being approximately 60% by weight of the balance weight 70a and a second body portion 80a of a second material being approximately 40% of the balance weight 70a. The first material, of which the first body portion 72a is formed, can be less dense than the second material, of which the second body portion 80a is formed. Therefore the volume of the first body portion 72a can be greater than the second body portion 80a.

FIGS. 4B and 4C, respectively, show second and third balance weights 70b and 70c. The second balance weight 70b includes a first body portion 72b and a second body portion 80b. The third balance weight 70c includes a first body portion 72c and a second body portion 80c. The balance weights 70a-70c can have different masses, but be substantially similar in shape and size. The second balance weight 70b can have a greater mass than the first balance weight 70a and the third balance weight 70c can have a greater mass than the second balance weight 70b.

The second balance weight 70b can have a greater mass than the first balance weight 70a because the second balance weight 70b has a larger relative percentage of the second material (the more dense material) than the first balance weight 70a. Similarly, the third balance weight 70c can have a greater mass than the second balance weight 70b because the third balance weight 70c has a larger relative percentage of the second material (the more dense material) than the second balance weight 70b. The balance weights 70a-70c thus have differently sized first body portions 72a-72c and differently sized second body portions 80a-80c.

The respective first and second body portions 72a-72c and 80a-80c include first and second apertures 74a-74c and 82a-82c aligned along a common axis 66a-66c, respectively. The first apertures 74a-74c each include a counter-sunk portion defining respective shoulders 78a-78c. The respective depths of the counter-sunk portions, represented by arrows 84a-84c, can be the same for all of the balance weights 70a-70c so that a common fastener can be used, wherein the top of the fastener will be flush with a top surface 86a-86c of the respective balance weight 70a-70c. The relative arrangements of the first and second materials can be such that the counter-sunk portion is defined in the material that is easier to form. For example, if the balance weights 70a-70c are formed from aluminum and tungsten, it may be desirable to arrange the materials such that the first body portions 72a-72c are aluminum since tungsten is more difficult to work than aluminum.

As set forth above, FIG. 3 shows a portion of an exemplary final assembly. The balance weight 70 includes a first or top surface 86 defining at least part of the radially inner boundary of the fluid flow path, along with the outer surface 48 of the spinner body 46. The fastener 76 can be adapted to couple the balance weight 70 to the spinner body 46 and to the retainer 37. The fastener 76 can include a top surface 88 also defining at least part of the radially inner boundary of the fluid flow path. The outer surface 48 and the first surface 86 and the second surface 88 can be flush with one another to enhance the aerodynamic properties of the mounting arrangement.

The materials of the balance weight 70 can be arranged to obtain additional benefits. For example, it may be desirable to arrange the materials such that the body portion formed of the more brittle material be disposed radially inward of the more ductile material. Such as arrangement can reduce the likelihood of the balance weight being a source of foreign objects passing into the fan and causing "foreign object damage" or FOD. If the balance weight 70 is formed from aluminum and tungsten, the second body portion 80 can be tungsten since tungsten is more brittle than aluminum. The tungsten portion would thereby be protected by the less brittle aluminum portion.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. The right to claim elements and/or sub-combinations of the combinations disclosed herein is hereby reserved.

What is claimed is:

1. A balance weight adapted to be assembled to a nose cone assembly of a turbine engine for improving a balance of the nose cone assembly, said balance weight being one-piece and formed from a plurality of different materials including at least first and second materials arranged substantially heterogeneously relative to one another such that said first and second materials are separate from one another and fixed together.

2. The balance weight of claim 1 further comprising: a first body portion formed from said first material; and a second body portion formed from said second material, wherein said first and second body portions are joined to one another with adhesive.

3. The balance weight of claim 1 wherein further comprising: a first body portion formed from said first material and having a first volume; and
a second body portion formed from said second material and having a second volume, wherein said first and second volumes are different from one another.

4. The balance weight of claim 1 wherein a density of said first material is at least twice a density of said second material.

5. The balance weight of claim 1 further comprising: a first body portion formed from said first material; and a second body portion formed from said second material, wherein said first and second body portions respectively include first and second apertures aligned along a common axis adapted to receive a fastener.

6. The balance weight of claim 1 wherein one of said first and second apertures includes a counter-sunk portion.

7. The balance weight of claim 1 further comprising a plurality of said balance weights, wherein a ratio of said first material relative to said second material varies between at least two of said plurality of balance weights to provide said at least two of said plurality of balance weights with different masses.

8. The balance weight of claim 1 further comprising a plurality of said balance weights, wherein each of said plurality of balance weights comprise:
a first body portion formed from said first material; and
a second body portion formed from said second material; and
wherein a plurality of said first body portions are differently sized from one another.

9. The balance weight of claim 8 wherein a plurality of said second body portions are differently sized from one another.

10. A kit comprising:
at least a plurality of balance weights each adapted to be assembled to a nose cone assembly of a turbine engine for improving a balance of the nose cone assembly, each of said plurality of balance weights being one-piece and formed from a plurality of different materials including at least first and second materials arranged substantially heterogeneously relative to one another such that said first and second materials are separate from one another and fixed together.

11. The kit of claim 10 wherein all of said plurality of balance weights are formed from the same combination of materials.

12. The kit of claim 10 wherein all of said plurality of balance weights are the same volumetric size and at least two of said plurality of balance weights include different ratios of said first and second materials.

13. The kit of claim 10 wherein each of said plurality of balance weights further comprise:
a first body portion formed from said first material; and
a second body portion formed from said second material, wherein a plurality of said first body portions are differently sized from one another.

14. The kit of claim 10 further comprising:
a plurality of blanks each adapted to be assembled to the nose cone assembly of the turbine engine and substantially similarly shaped as said plurality of balance weights.

15. The kit of claim 10 wherein a density of said first material is at least twice a density of said second material.

16. The kit of claim 10 wherein a ratio of said first material relative to said second material varies between at least two of said plurality of balance weights to provide said at least two of said plurality of balance weights with different masses.

17. The kit of claim 10 wherein each of said plurality of balance weights further comprise:
a first body portion formed from said first material; and
a second body portion formed from said second material, wherein said first and second body portions respectively include first and second apertures aligned along a common axis adapted to receive a fastener and wherein one of said first and second apertures includes a counter-sunk portion.

18. The kit of claim 17 wherein a depth of said counter-sunk portion is the same for all of said plurality of balance weights.

19. The kit of claim 17 wherein said counter-sunk portion is formed the one of said first and second materials being easier to form.

20. A turbine engine comprising:
a fan adapted for rotation about a centerline axis;
a nose cone assembly coupled for rotation with said fan and having an outer surface defining at least part of a radially inner boundary of a fluid flow path into said fan; and
at least one balance weight assembled to said nose cone assembly for improving a balance of said nose cone assembly, said balance weight being one-piece and formed from a plurality of different materials including at least first and second materials arranged substantially heterogeneously relative to one another such that said first and second materials are separate from one another and fixed together.

21. The turbine engine of claim 20 wherein said at least one balance weight is further defined as:
a plurality of balance weights each including a first body portion formed from said first material and a second body portion formed from said second material, wherein a plurality of said second body portions are differently sized from one another.

22. The turbine engine of claim 20 wherein said first material is further defined as more brittle than the second material and is positioned radially inward of said second material.

23. The turbine engine of claim 20 wherein said first material is aluminum and said second material is tungsten.

24. The turbine engine of claim 20 wherein said at least one balance weight includes a first surface defining at least part of the radially inner boundary of the fluid flow path.

25. The turbine engine of claim 24 further comprising:
a fastener adapted to couple said at least one balance weight to said nose cone assembly and including a second surface defining at least part of the radially inner boundary of the fluid flow path, wherein said outer surface and said first surface and said second surface are flush with one another.

* * * * *